J. E. MITCHELL.
COTTON EXTRACTING AND CLEANING MACHINE.
APPLICATION FILED AUG 26, 1920.
1,426,588.
Patented Aug. 22, 1922.
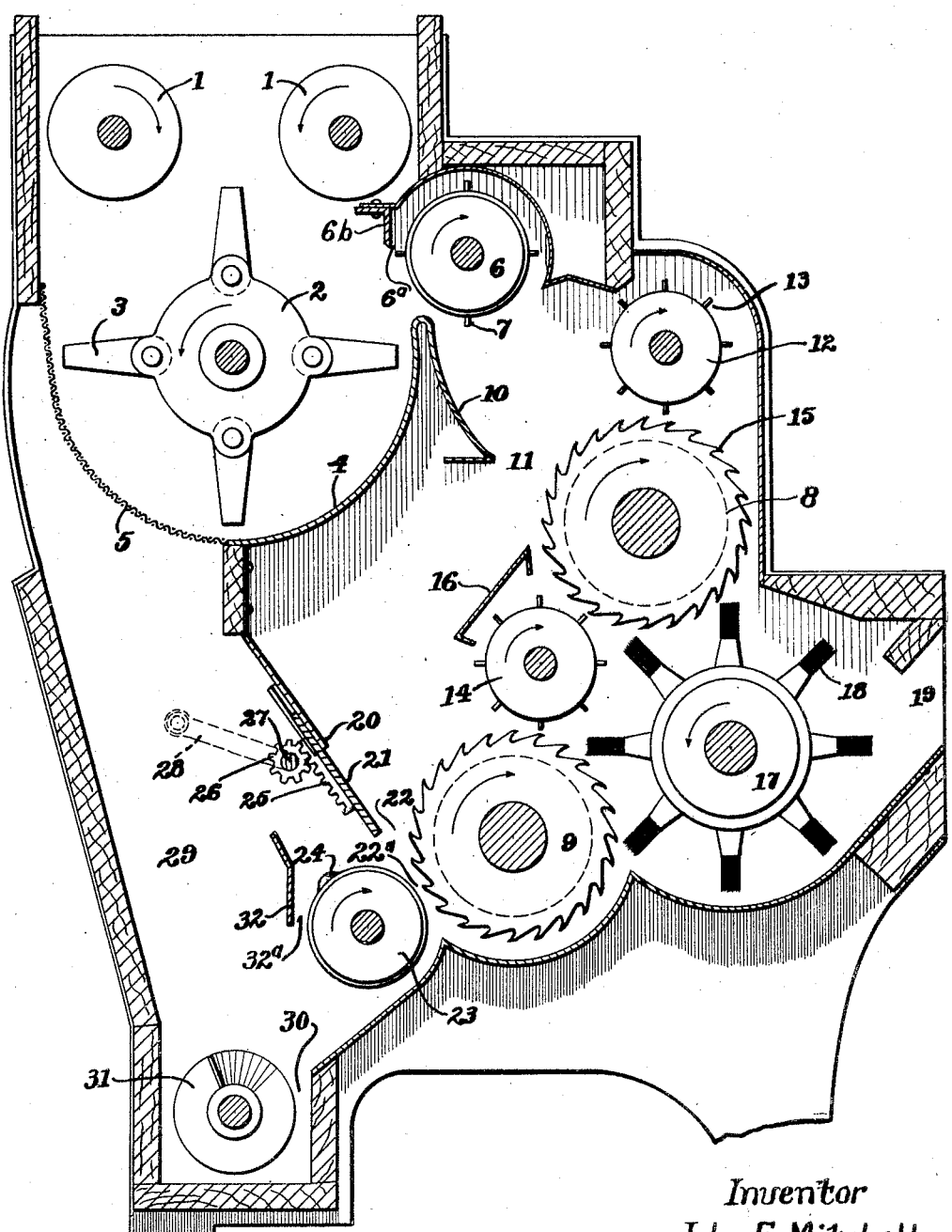
Inventor
John E. Mitchell
By Elliott T. Ammen
Atty's

UNITED STATES PATENT OFFICE.

JOHN E. MITCHELL, OF ST. LOUIS, MISSOURI.

COTTON EXTRACTING AND CLEANING MACHINE.

1,426,588. Specification of Letters Patent. Patented Aug. 22, 1922.

Application filed August 26, 1920. Serial No. 406,117.

*To all whom it may concern:*

Be it known that I, JOHN E. MITCHELL, a citizen of the United States, residing in the city of St. Louis and State of Missouri, have invented new and useful Improvements in Cotton Extracting and Cleaning Machines, of which the following is a specification.

This invention relates to a boll breaking and cotton separating machine of the type illustrated in various patents heretofore granted to myself or to Dennis Parks or to myself and the said Parks jointly. Such prior machines have been characterized by the use of a single saw cylinder as the main element in separating the cotton from the broken bolls, hulls and trash. It is a general object of the present invention to produce a machine of the type referred to which shall have practically double the capacity thereof.

Stated more in detail, it is an object of the present invention to provide, within the limited space or height where such machines have to be installed, a machine having two saw cylinders, each of which has the capacity of the single saw cylinder of the prior machines referred to so that the two saw cylinders will have approximately double the separating capacity of the single saw cylinder machine.

A further object is to mount the two saw cylinders in such a way in relation to each other, and in relation to the necessary kicker roller operating in connection with each saw cylinder, as that the cotton may be brushed from the two rotating saw cylinders by a single doffer brush, which latter causes the cotton separated by each of the two saw cylinders to be combined and delivered from the machine to the gin through a single discharge opening. This arrangement makes possible the construction and operation of a machine carrying two saw cylinders and their co-operating kicker rollers within the available space for installing such machines between the gin and the cotton distributor.

A still further object is to provide an improved discharge for the hulls past the lower saw cylinder whereby the difference in charter between the hulls and the cotton is taken advantage of in such a manner that the cotton will be caused to be brought into contact with, and adhere to the teeth of the saws, while the hulls will be separated from the cotton. This latter object is attained, essentially by the use of a roller carrying an extended rib or bumper, which, in the rotation of the roller will act, by impact, to knock the hulls upward and away from the cotton, while the cotton particles themselves, being softer and lighter will be thrown or carried by the bumper into engagement with the teeth of the lower saw cylinder.

The drawing is a vertical section through a machine showing a preferred embodiment of the invention.

Referring now to the drawing, the numerals 1 indicate two feed rollers which operate to pass the mixed cotton and bolls to the boll breaking cylinder 2 having pivoted fingers 3 and revolving in a casing 4, one side of which carries a screen 5 of wire mesh through which dirt and small particles of hulls may pass. The casing 4 has an outlet 6ª located opposite to the screen the size of which is determined by a picker roll 6 operating in proximity to one edge of an anglebar 6ᵇ, as shown, and which roll carries pins or pickers 7 and rotates in a clockwise direction. This picker roll operates to withdraw the cotton and the broken bolls as the latter are reduced by the breaking cylinder, and to deliver the mixed product to the cotton separating mechanism. This mechanism will now be described.

Mounted to rotate within the main casing of the machine are two saw cylinders, 8 and 9, the latter of which is located below the former and to one side thereof. The saws of each cylinder operate wholly in the clear, that is to say, they do not rotate between grate bars, as in an ordinary cotton gin, and there is no device of any kind which passes between the blades of the saws, or which lies in functional juxtaposition to the cotton engaging side thereof. I thus preserve in this machine this feature which is a characteristic of all of my previous patented machines. The cotton and hull particles are directed by the picker roll toward the upper saw cylinder 8 and to facilitate this operation I provide an inclined hull board 10 which projects toward the adjacent side of the saw cylinder 8 in such a way as to leave an opening 11 between its lower end and the side of the saw cylinder. Co-operating with the saw cylinder 8 and located above the same is a kicker roll 12, the blades 13 of which rotate in proximity to the upper side of the saw cylinder 8 in a direction, as shown by the arrow, to knock back boll pieces, or hulls, and other solid particles, toward the opening 11. The numeral 14 indicates a similar kicker roll which is located to co-operate in a similar manner with the lower saw cylinder 9 and is located between the two saw cylinders. These saw cylinders are driven in the same direction and are provided with the usual teeth 15 projecting in the direction in which the saws rotate. If the amount of the mixed cotton and hulls delivered to the first saw cylinder is in excess of the capacity of this cylinder, the residue will pass downwardly through the opening 11 to be operated upon by the saw cylinder 9. In order to direct the same toward this latter saw cylinder and to exclude it from further contact with the kicker roll 14 I provide a guard in the form of a cant board 16 which is disposed in an inclined position and covers the side of the kicker roll 14 which would otherwise be exposed to the product passing to the lower saw cylinder. The kicker rolls, as shown, rotate in the same direction as the saw cylinders so that the working side of each roll rotates in the opposite direction to the adjacent side of the saw cylinder, thereby operating to kick off pieces of boll which may be adhering to the cotton carried by the saws.

The numeral 17 indicates a rotary doffer provided with a plurality of radial brushes 18. This doffer is located between the two saw cylinders 8 and 9, at an equal distance from each, and is so positioned that it functions simultaneously with both saw cylinders. The doffer rotates in an opposite direction to said saw cylinders so that the brushes move in the same direction with the saw teeth with which they co-operate, but at a higher speed, so as to enable the brushes to remove the cotton from the saw cylinders and discharge the same through the cotton discharge opening 19.

The numeral 20 indicates a hull board, which extends in an inclined direction toward the side of the saw cylinder 9 opposite to the doffer 17, and this hull board preferably includes an adjustable extension 21 which may be extended to any desired point in order that its lower edge may define the size of an opening 22 past the saw cylinder 9. Just below this opening I provide a hull roller 23 which rotates in the same direction as the saw cylinder 9, and is provided at one side with a rib or bumper 24 extending from end to end of the roller, and the function of which will be presently described. The surface of the hull roller 23 is smooth, except for the provision of the bumper 24.

The extension 21 of the lower hull board can be adjusted in any suitable manner, for example, by means of racks 25 disposed near each side of the machine and engaged by a pinion 26. These pinions may be carried on a common shaft 27 and operated on the outside by means of a crank or lever 28.

The trash and dirt which come through the screen 5 pass down through a passage 29 at the rear of the hull board 20 and fall into a trough 30 at the bottom of the machine in which is located a screw conveyer 31 for removing such trash, dirt and the like from the machine. Located adjacent to the hull roller 23 on the side opposite to that facing saw cylinder 9, is a hull board 32 for co-operating with said hull roller 23.

In operation, the bolly cotton is forced into the breaking chamber by the feeders 1 in the usual way. The yielding fingers of the revolving breaker cylinder engage the bolls and force them first against the screen 5, through which the loose trash and dirt pass to the conveyer 31 below. The bolls, in being forced around the chamber of the breaker cylinder, are struck hammer blows by the fingers 3 of the breaker cylinder, which opens the bolls, frees the cotton, and separates the boll hulls from each other where they are joined together. As rapidly as this is done, the cotton and the loose hulls are carried out of the breaking chamber through the space or opening 6ª by the pins or ribs on the picker roll 6. The outlet 6ª extends the full length of the breaker cylinder 2 and the picker roll 6. The cotton and loose hulls are discharged by the picker roll onto the hull board 10, whence this mixed product slides off into contact with the teeth of the upper saw cylinder 8, which carry the cotton to the doffer brush 17, the hulls being separated from the cotton as it passes under the kicker roll 12. The space 11 between the lower end of the hull board 10 and the upper saw cylinder 8 is comparatively wide, which permits a free discharge of the hulls and any surplus cotton not separated from the hulls by the first saw cylinder 8. This surplus cotton, with the hulls is directed by the cant board 16 onto the hull board 20 whence it slides into contact with the teeth of the lower saw cylinder 9, the cotton being carried around by said teeth to the doffer brush 17 in the same manner as described with reference to the upper saw cylinder, the hulls sticking to the cotton being kicked back by the kicker roll 14; these hulls, with a very small percentage of cotton being discharged through the opening 22 between the lower end of the hull board 20 and the saw cylinder 9, the mixture falling upon the rapidly revolving hull roller 23 which revolves in the direction shown by the arrow. The smaller particles of hull are carried around through the space 22ª between the hull roller and the lower saw cylinder 9 and are discharged into the trough 30 below. Larger hulls, and small locks of cotton are kicked back by the teeth of saw cylinder 9 over against the hull board 32, the medium sized hulls falling through the space 32ª between the bottom of the hull board 32 and the revolving surface of the hull roller 23, and such hulls, with the smaller particles passing through the space 22ª on the opposite side of the roller, falling into the trough 30 below.

While the spaces 22ª and 32ª on the opposite sides of the revolving roller 23 discharge a considerable portion of the hulls, neither space is wide enough to permit the discharge of any cotton of value; and while the teeth of the saw cylinder 9 are constantly throwing locks of cotton of more or less value back over the hull roller 23 and against the hull board 32, the spaces 22ª and 32ª are, as stated, too small to permit such cotton to discharge with the hulls passing through the same. Such cotton therefore, as is thrown out by the teeth of the saw cylinder is instantly returned to the saw cylinder and when the teeth of the saw get a sufficient hold thereon it is carried up through the space 22 between the hull board 20 and the saw cylinder and over to the doffer brush 17. In the meantime the hulls knocked by the saw teeth over against the hull board 32 that are too large to be discharged through either of the spaces 22ª or 32ª, are, according to my invention, discharged over the top of the hull board 32. This is accomplished by the provision of the rib or bumper 24 on the hull roller 23, which serves to knock the large hulls up against the bottom of the hull board 20, which sets at such an angle that these hulls are caused to glance off or outward away from the roll and to fall through the passage 29 at the rear of the hull board 32 into the trough 30. While the bumper 24 is very effective in knocking or bouncing the comparatively hard hulls up against the underside of the hull board 20, the yielding or springy character of the locks of cotton is such that they are not thrown or knocked with the same force and will eventually be carried by the action of the hull roller 23 into engagement with the teeth of the saw cylinder 9 and be recovered. With this knowledge of the difference in character between the hull particles and locks of cotton it is a comparatively simple matter to so construct the bumper 24 and to so adjust the speed of rotation of the roller 23 as to cause said hull roller to rapidly throw out all hulls too large to pass through the openings 22ª and 32ª without at the same time throwing out or discharging any cotton of value. The combination therefore, of the hull roller 23 with this bumper 24 and the properly placed hull board 32 enables me to provide for the discharge from the machine of the hulls with the necessary rapidity without loss of cotton.

It will be seen from the above description of the construction and operation of my invention, that the upper saw cylinder 8 is never overloaded, due to the fact that I provide for the free discharge of the hulls and surplus cotton through the comparatively wide gap 11 between the hull board 10 and the teeth of the upper saw cylinder. It will also be seen that the lower saw cylinder 9 will have a comparatively light load of cotton to contend with by reason of the fact, that in practice, from one-half to two-thirds of the bulk of the cotton itself is separated or extracted from the mass by the upper saw cylinder 8. In other words, the very free and rapid discharge provided for hulls passing the upper saw cylinder leaves comparatively few hulls for the upper kicker roll 12 to act upon, so that the bulk of the cotton can be separated on the upper saw cylinder 8 without the risk of many hulls going with it past said upper kicker roll; whereas the lower saw cylinder, having comparatively little cotton to deal with, the hulls are not obstructed from discharging rapidly and freely through the smaller space between the hull board 20 and the teeth of the saw cylinder 9, and the very small percentage of cotton which falls with the hulls onto the rapidly revolving roller 23, is readily recovered in the manner above described. Finally, it will be seen, that the single doffer brush 17 removes the cotton simultaneously from the two saw cylinders, combines it and discharges it through the single discharge opening 19 to the gin below (not shown), while all of the trash, dirt, and the hulls discharged through the several openings referred to, are collected by the conveyer 31 and discharged from the machine in the usual way.

The machine which I have illustrated in the drawing represents the best embodiment of the invention now known to me, and by its use I have demonstrated that its capacity is almost double that of the single cylinder machine, which result is accomplished, without materially increasing the size of the machine over the former type, by the arrangement shown, and particularly by the provision of the single doffer brush co-operating with the two saw cylinders. At the same time I do not wish to be limited to the exact details of construction shown, as various changes therein could no doubt be made without departing from the spirit of my invention.

I claim:—

1. In a boll breaking and cotton separating machine, the combination of boll breaking means, an upper and a lower saw cylinder, the saws of which operate wholly in the clear as respects the cotton engaging side thereof, a hull board co-operating with each saw cylinder to direct mixed cotton and hulls falling by gravity over the same against the saws, and the lower edges of said hull boards defining the sizes of openings past the cylinders, the opening past the upper saw cylinder being larger than the opening past the lower saw cylinder, a kicker roll co-operating with each cylinder, means for feeding the cotton and broken bolls to the saw cylinders from the boll breaking means, and a rotary doffer common to both saw cylinders and co-operating therewith to simultaneously remove the cotton therefrom.

2. In a boll breaking and cotton separating machine, the combination of boll breaking means, a casing inclosing an upper and lower rotary saw cylinder, the saws of which operate wholly in the clear as respects the cotton engaging side thereof, a kicker roll co-operating with each saw cylinder, hull boards for directing mixed cotton and hulls falling by gravity over the same against the saws, and defining, respectively, the sizes of openings past said saw cylinders, the opening past the upper saw cylinder being larger than the opening past the lower saw cylinder, means for feeding the cotton and broken bolls to the saw cylinders from the boll breaking means, and a rotary doffer common to both saw cylinders and co-operating therewith to simultaneously remove the cotton therefrom, the construction presenting an uninterrupted path between the opening past the upper saw cylinder to the hull board of the lower saw cylinder, so that the products escaping through said opening may fall by gravity on the said hull board.

3. In a boll breaking and cotton separating machine, the combination of boll breaking means, a pair of rotary saw cylinders, the saws of which operate wholly in the clear as respects the cotton engaging side thereof, means for feeding the cotton and broken bolls to the saw cylinders from the boll breaking means, a hull board co-operating with each saw cylinder to direct mixed cotton and hulls falling by gravity over the same against the saws, and defining the sizes of openings past the cylinders, the opening past the upper saw cylinder being larger than the opening past the lower saw cylinder, the construction presenting an uninterrupted path between the opening past the upper saw cylinder to the hull board of the lower saw cylinder, so that products escaping through said opening may fall by gravity on the said hull board, a kicker roller co-operating with each of said saw cylinders, one of said kicker rolls being located between the two saw cylinders, a cant board covering the side of the latter kicker roll that is exposed to the cotton and broken bolls passing through the opening past the upper saw cylinder, and a rotary doffer common to both of said saw cylinders and co-operating therewith to simultaneously remove the cotton therefrom.

4. In a boll breaking and cotton separating machine, the combination of boll breaking means, an upper and a lower saw cylinder, the saws of which operate wholly in the clear as respects the cotton engaging side thereof, a hull board co-operating with each saw cylinder to direct mixed cotton and hulls falling by gravity over the same against the saws, and defining the sizes of openings past the cylinders, the opening past the upper saw cylinder being larger than the opening past the lower saw cylinder, a kicker roll co-operating with each cylinder, means for feeding the cotton and broken bolls to the saw cylinders from the boll breaking means, a feed roller located under the opening past the lower saw cylinder, and a rotary doffer common to both saw cylinders and co-operating therewith to simultaneously remove the cotton therefrom.

5. In a boll breaking and cotton separating machine, cotton separating mechanism comprising a rotary saw cylinder, a kicker roll co-operating therewith and an inclined hull board, the lower end of which defines the size of an opening past the saw cylinder, a rotary hull roller located below said opening in juxtaposition to said saw cylinder and provided on one side with a bumper extending substantially throughout its length, and a hull board co-operating with said hull roller, the two hull boards providing between them an outlet, whereby the hulls passing through said opening will be knocked by said bumper through said outlet and the cotton particles passing through said opening will be delivered by said roller to the saw cylinder.

6. In a boll breaking and cotton separating machine, the combination of a casing inclosing an upper and a lower rotary saw cylinder, a hull board co-operating with each saw cylinder and defining the sizes of openings past the same, the opening past the upper saw cylinder being larger than the opening past the lower saw cylinder, a rotary hull roller located below the opening past the lower saw cylinder in juxtaposition to said saw cylinder and provided on one side with a bumper extending substantially throughout its length, and a hull board co-operating with said hull roller, the latter hull board with the hull board of said lower saw cylinder, providing an outlet whereby the hulls passing through the last mentioned opening will be knocked by said bumper through said outlet, and the cotton particles in passing through said opening will be delivered by said roller to the saw cylinder.

In testimony whereof, I have hereunto set my hand.

JOHN E. MITCHELL.